US010945302B2

United States Patent
Tooher et al.

(10) Patent No.: US 10,945,302 B2
(45) Date of Patent: Mar. 9, 2021

(54) MANAGING RACE CONDITIONS BETWEEN CIRCUIT SWITCHED FALLBACK REQUESTS

(75) Inventors: J. Patrick Tooher, Montreal (CA); Mahmoud Watfa, Saint Leonard (CA); Behrouz Aghili, Commack, NY (US); Ulises Olvera-Hernandez, Kirkland (CA); Pascal Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 513 days.

(21) Appl. No.: 13/072,692

(22) Filed: Mar. 26, 2011

(65) Prior Publication Data

US 2012/0069731 A1 Mar. 22, 2012

Related U.S. Application Data

(60) Provisional application No. 61/318,070, filed on Mar. 26, 2010, provisional application No. 61/408,996, filed on Nov. 1, 2010.

(51) Int. Cl.
*H04W 76/16* (2018.01)
*H04W 36/00* (2009.01)
*H04W 36/14* (2009.01)

(52) U.S. Cl.
CPC ........ *H04W 76/16* (2018.02); *H04W 36/0022* (2013.01); *H04W 36/14* (2013.01)

(58) Field of Classification Search
CPC .. H04W 36/0022; H04W 76/16; H04W 36/14
USPC ....................................................... 370/230
See application file for complete search history.

(56) References Cited

U.S. PATENT DOCUMENTS

| 8,027,688 | B2 | 9/2011 | Wu | |
|---|---|---|---|---|
| 8,565,189 | B2* | 10/2013 | Tanaka | H04W 36/0022 370/331 |
| 2007/0263650 | A1* | 11/2007 | Subramania | H04L 47/10 370/412 |
| 2009/0003276 | A1* | 1/2009 | Mutikainen | H04W 48/18 370/329 |

(Continued)

FOREIGN PATENT DOCUMENTS

| CN | 101552959 A | 10/2009 |
|---|---|---|
| CN | 101577966 A | 11/2009 |

(Continued)

OTHER PUBLICATIONS

3GPP TS 24.301 V8.2.1, 3rd Generation Partnership Project;Technical Specification Group Core Network and Terminals; Non-Access-Stratum (NAS) protocol for Evolved Packet System (EPS); Jun. 2009.*

(Continued)

*Primary Examiner* — Tejis Daya
(74) *Attorney, Agent, or Firm* — Condo Roccia Koptiw LLP

(57) ABSTRACT

Circuit switched fallback (CSFB) requests may be managed. A mobile management entity (MME) can detect one or more pending CSFB requests. In response to detecting the pending CSFB request(s), the MME can generate a message that indicates the one or more pending CSFB requests, and can communicate the message to one of a mobile switching center (MSC) and a virtual location register (VLR).

14 Claims, 10 Drawing Sheets

(56) References Cited

U.S. PATENT DOCUMENTS

| | | | |
|---|---|---|---|
| 2009/0042576 A1* | 2/2009 | Mukherjee | H04J 11/0093 455/436 |
| 2009/0170426 A1* | 7/2009 | Jung et al. | 455/7 |
| 2009/0270099 A1* | 10/2009 | Gallagher | H04W 8/08 455/435.1 |
| 2009/0274122 A1* | 11/2009 | Wu | H04W 76/34 370/331 |
| 2010/0054187 A1* | 3/2010 | Hallenstal | H04W 80/04 370/328 |
| 2010/0113024 A1* | 5/2010 | Wu | H04W 36/14 455/436 |
| 2010/0182971 A1* | 7/2010 | Chin | H04W 76/16 370/329 |
| 2010/0227621 A1* | 9/2010 | Wu | H04L 47/745 455/450 |
| 2010/0279677 A1* | 11/2010 | Dwyer | H04W 48/16 455/422.1 |
| 2010/0297979 A1* | 11/2010 | Watfa | H04W 8/205 455/404.1 |
| 2010/0317378 A1* | 12/2010 | Fang | H04W 36/0022 455/466 |
| 2011/0077011 A1* | 3/2011 | Wang | H04W 68/12 455/445 |
| 2011/0080867 A1* | 4/2011 | Mildh | 370/328 |
| 2011/0080894 A1 | 4/2011 | Iwamura et al. | |
| 2011/0085517 A1 | 4/2011 | Yu et al. | |
| 2011/0117931 A1* | 5/2011 | Hu | H04W 60/005 455/456.1 |
| 2011/0171926 A1* | 7/2011 | Faccin | H04W 48/18 455/404.1 |
| 2011/0274045 A1* | 11/2011 | Wu | H04W 76/041 370/328 |
| 2012/0009952 A1* | 1/2012 | Zhang | H04W 68/00 455/458 |
| 2012/0069731 A1* | 3/2012 | Tooher | H04W 76/16 370/221 |
| 2012/0094627 A1* | 4/2012 | Suh | H04W 4/22 455/404.1 |
| 2013/0016700 A1* | 1/2013 | Yu | H04W 36/0022 370/331 |
| 2015/0016423 A1 | 1/2015 | Yu et al. | |

FOREIGN PATENT DOCUMENTS

| | | | |
|---|---|---|---|
| CN | 101610458 A | 12/2009 | |
| JP | 2009-267997 A | 11/2009 | |
| JP | 2009267996 A | 11/2009 | |
| JP | 2010-068250 A | 3/2010 | |
| JP | 2010063151 A | 3/2010 | |
| WO | WO 2008081310 A1 * | 7/2008 | H04W 36/0022 |
| WO | WO 2009/092319 A1 | 7/2009 | |
| WO | WO 2009/152738 A1 | 12/2009 | |
| WO | WO 2010/019364 A1 | 2/2010 | |

OTHER PUBLICATIONS

Jakub Bluszcz, CSFB and SMSoSGs, Oct. 17, 2009.*
3rd Generation Partnership Project (3GPP), S2-101354, "Service Type Indication in CSFB for Mo Call", NEC, 3GPP TSG SA WG2 Meeting #78, San Francisco, USA, Feb. 2010, 8 pages.
3rd Generation Partnership Project (3GPP), S2-101771, "Correction of CSFB MT Call", Huawei, Alcatel-Lucent, Ericsson, ST-Ericsson, 3GPP TSG-SA WG2 Meeting #78, San Francisco, USA, Feb. 2010, 16 pages.
3rd Generation Partnership Project; Technical Specification Group Services and System Aspects; Circuit Switched Fallback in Evolved Packet System; Stage 2 (Release 9), 3GPP TS 23.272 V9.2.0, Jun. 2009, pp. 1-64.
3rd Generation Partnership Project; Technical Specification Group Services and System Aspects; Circuit Switched (CS) fallback in Evolved Packet System (EPS); Stage 2 (Release 10), 3GPP TS 23.272 V10.1.0, Sep. 2010, pp. 1-78.
3rd Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.8.0, Dec. 2009, pp. 1-239.
3rd Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401 V9.3.0, Dec. 2009, pp. 1-254.
3rd Generation Partnership Project; Technical Specification Group Core Network and Terminals; Non-Access-Stratum (NAS) protocol for Evolved Packet System (EPS); Stage 3 (Release 8), 3GPP TS 24.301 V8.4.0, Dec. 2009, pp. 1-275.
3rd Generation Partnership Project; Technical Specification Group Core Network and Terminals; Non-Access-Stratum (NAS) protocol for Evolved Packet System (EPS); Stage 3 (Release 9), 3GPP TS 24.301 V9.1.0, Dec. 2009, pp. 1-285.
3rd Generation Partnership Project; Technical Specification Group Core Network and Terminals; Non-Access-Stratum (NAS) protocol for Evolved Packet System (EPS); Stage 3 (Release 10), 3GPP TS 24.301 V10.0.0, Dec. 2010, pp. 1-299.
3rd Generation Partnership Project; Technical Specification Group Radio Access Network; Evolved Universal Terrestrial Radio Access (E-UTRA) Radio Resource Control (RRC); Protocol specification (Release 9), 3GPP TS 36.311 V9.1.0, Dec. 2009, pp. 1-233.
InterDigital Communications LLC, Local Bearer deactivation during CSFB, 3GPP TSG-CT WG1 Meeting #69, C1-110762, Ljubljana (Slovenia), Jan. 24-28, 2011, pp. 1-3.
Itsuma Tanaka et al., "CS Fallback Function for Realizing Association of LTE with 3G Channel Exchange Service", NTT Docomo Technical Journal, vol. 17, No. 3, the Telecommunications Association (TTA), Oct. 1, 2009, pp. 15-20.
Itsuma Tanaka et al., "CS Fallback Function for Combined LTE and 3G Circuit Switched Services", NTT Docomo Technical Journal, vol. 11, No. 3, Dec. 2009, pp. 13-19.
Itsuma Tanaka, et al., "CS Fallback Function for Realizing Association of LTE with 3G Channel Exchange Service", NTT Docomo Technical Journal, vol. 17, No. 3, the Telecommunications Association (TTA), Oct. 1, 2009, 28 pp.
3$^{rd}$ Generation Partnership Project (3GPP), TS 24.301 V10.3.0, "3$^{rd}$ Generation Partnership Project; Technical Specification Group Core Network and Terminals; Non-Access-Stratum (NAS) protocol for Evolved Packet System (EPS); Stage 3 (Release 10)", Jun. 2011, 316 pages.
3$^{rd}$ Generation Partnership Project (3GPP), TS 36.331 V9.1.0, , 3$^{rd}$ Generation Partnership Project; Technical Specification Group Radio Access Network; Evolved Universal Terrestrial Radio Access (E-UTRA) Radio Resource Control (RRC); Protocol specification (Release 9), Dec. 2009, 233 pages.

* cited by examiner

MANAGING RACE CONDITIONS BETWEEN CIRCUIT SWITCHED FALLBACK REQUESTS

CROSS-REFERENCE TO RELATED APPLICATIONS

This application claims the benefit of U.S. Provisional Patent Application No. 61/318,070 filed on Mar. 26, 2010 and U.S. Provisional Patent Application No. 61/408,996 filed on Nov. 1, 2010, both of which are incorporated herein by reference in their entirety.

BACKGROUND

The Third Generation Partnership Project (3GPP) Long Term Evolution (LTE) standards provide specifications for high performance air interfaces for cellular mobile communication systems. LTE specifications are based on Global System for Mobile Communications (GSM) specifications, and provide the upgrade path for 3G networks to evolve into partially-compliant 4G networks. LTE Advanced is an enhancement of the LTE standard that provides a fully-compliant 4G upgrade path for LTE and 3G networks.

A goal of 3GPPP and LTE is the simplification of the architecture of cellular mobile communication systems. One step in simplifying this architecture is transitioning from existing 3GPP universal mobile telecommunications system (UMTS) combined circuit and packet switched networks to pure internet protocol (IP) packet switched systems. Because the adoption of LTE is an ongoing process and many mobile devices are not yet compatible with LTE packet switched technologies, operators of LTE networks will typically run such networks in conjunction with circuit-switched networks. This allows network operators to service users of circuit-switched compatible devices as well as users of LTE compatible devices.

SUMMARY

Devices, systems, and methods for managing circuit switched fallback (CSFB) requests are disclosed. According to an aspect, a mobile management entity (MME) can detect one or more pending CSFB requests. In response to detecting the pending CSFB request(s), the MME can generate a message that indicates the one or more pending CSFB requests, and can communicate the message to one of a mobile switching center (MSC) and a virtual location register (VLR).

According to another aspect, a wireless transmit/receive unit (WTRU) can receive an instruction for managing a CSFB request. In response to receipt of the instruction, the WTRU can implement the instruction in a radio access technology (RAT) environment.

According to yet another aspect, an MME can receive a paging request for a CSFB request. The MME can also communicate to a WTRU an instruction for managing a CSFB request in response to receipt of the paging request. The WTRU may implement the instruction in response to receipt. For example, the instruction may be implemented in a RAT environment.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
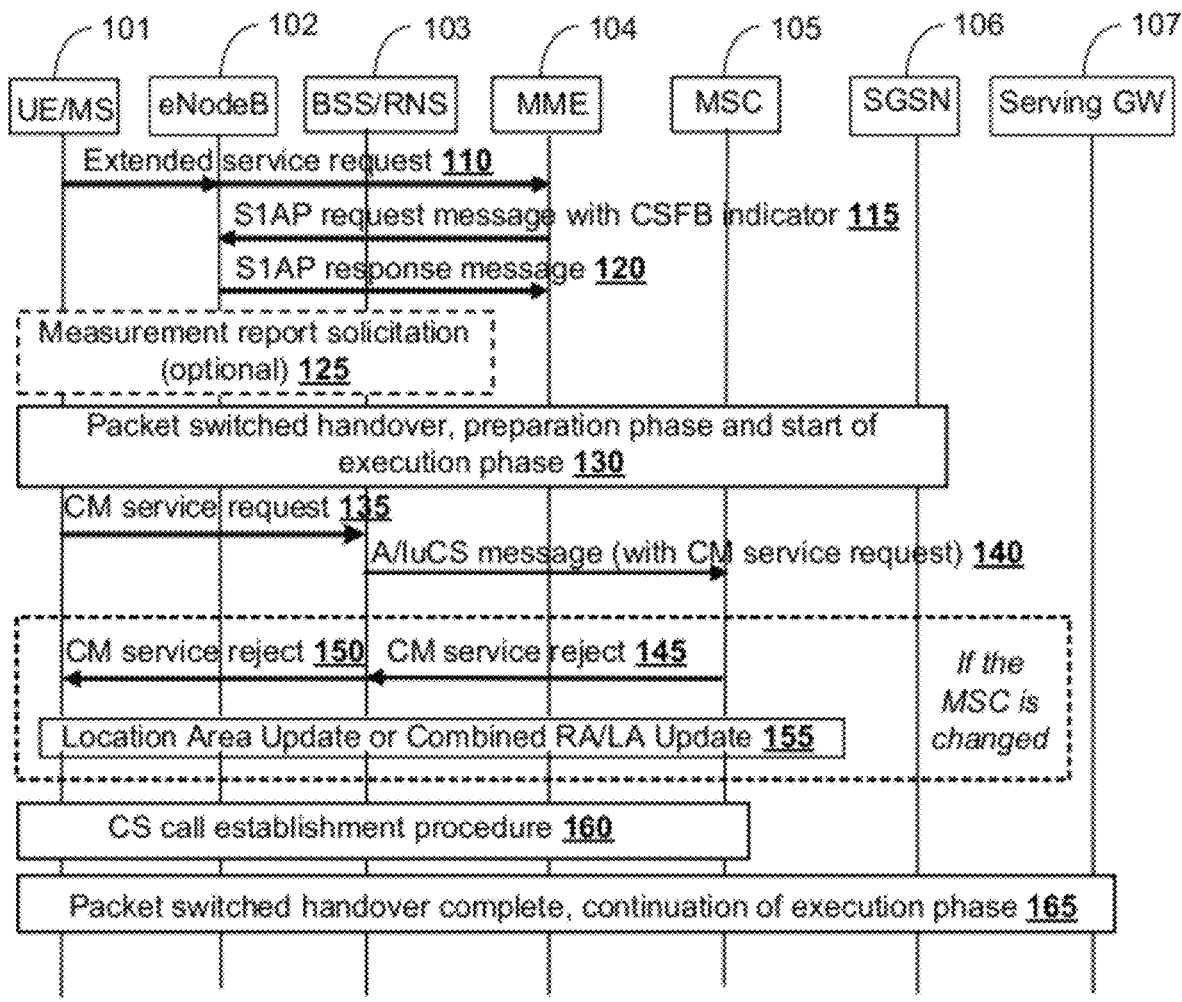
FIG. 1 illustrates an example message flow diagram showing the signaling flow for a Mobile Originated CSFB (MO CSFB) according to embodiments of the present disclosure.

User equipment (UE) is able to connect to the Packet Switched (PS) domain of E-UTRAN while maintaining circuit switched (CS) capabilities by initially performing a combined Attach procedure. Two scenarios may arise where a UE may perform CS fallback (CSFB). In the first scenario, while the UE is either idle or active mode, it may choose to request the placement of a CS service (i.e. a voice call). Such a scenario is termed a Mobile Originated CSFB (MO CSFB) request and requires the UE to send an extended service request (ESR). In the second scenario, while the UE is in idle or active mode, it may receive a paging message indicating CSFB (if the UE is idle) or it may equivalently receive a CS service notification from the mobile management entity (MME) (if the UE is active). Such a scenario is termed a mobile terminated CSFB (MT CSFB) request. In both scenarios, the UE is instructed to fall back to a CS radio access technology (RAT) where it is already registered. This may be performed using a packet switched (PS) handover (PS HO), cell change operation (CCO) or RRC connection release. For both scenarios of CSFB, the signaling may be done over LTE but the actual CS service may performed over the legacy RAT.

For CSFB from idle mode, the UE sends the ESR message. The network may choose to establish the PS bearers in LTE before executing the CSFB, i.e., the network will attempt a PS HO as a way to provision CSFB. Alternatively, the network may choose not to establish the PS bearers in LTE and instead redirect the UE to the CS domain (e.g., with the use of the RRC connection release message that includes redirection information). Thus, it is desired to provided improved techniques for managing CSFB-related processes.

System and method embodiments for managing race conditions between MO and MT CSFB requests are disclosed. For example, in MO and MT CSFB request scenarios, only a subset of involved nodes may be aware of an ongoing MO CSFB request or MT CSFB request because signaling is performed in the LTE network. Thus, it is possible that a second CSFB request (e.g., an MO CSFB request in the case where the first request was an MT CSFB request, or vice versa) may be initiated before the first CSFB request is fully processed. This may present a conflict as to how to deal with both requests simultaneously. In these cases, it is possible that one of the nodes in the network will receive unexpected messages when it anticipated a specific type of message. In such scenarios, the behavior of each node is not specified in the LTE specifications, nor is a conflict resolution strategy currently specified. The present disclosed subject provides techniques for managing these and other situations.

In an example, if the network chooses to establish PS bearers in LTE before performing the CSFB, the network might establish radio resources for all bearers (EPS bearer contexts) that were established by the UE, or possibly, the network might establish a subset of these bearers. In the UE, the NAS is informed by lower layers if some bearers (which map to EPS bearer contexts via a one-to-one identity mapping) were not established. If this is the case, the UE then locally deactivates the corresponding EPS bearer contexts for which no radio bearers were established. Note however that the default bearer (corresponds to the default EPS bearer context) must always be established for normal operation. If this bearer is not established, then the UE must detach from the network.

There are currently-specified features about the EPS bearer context during the service request procedure. If the ESR message was used and radio bearer establishment takes place during the procedure, the UE can locally deactivate the EPS bearer contexts that do not have a user plane radio bearer established upon receiving a lower layer indication of radio bearer establishment. The UE does not perform local deactivation of EPS bearer contexts upon receiving an indication of inter-system change from lower layers. When the user plane radio bearer for a default EPS bearer context is not established during the service request procedure or tracking area updating procedure with "active" flag, the UE can locally deactivate all EPS bearer contexts associated to the PDN connection with the default EPS bearer context. The MME can locally deactivate all EPS bearer contexts associated to the PDN connection with the default EPS bearer context without peer-to-peer ESM signaling to the UE. If due to any of the cases described above the UE locally deactivates all EPS bearer contexts, the UE can perform a local detach, enter state EMM-DEREGISTERED and initiate an attach procedure.

When referred to, the term "wireless transmit/receive unit (WTRU)" includes, but is not limited to, user equipment (UE), a mobile station, a fixed or mobile subscriber unit, a pager, a mobile telephone or cellular telephone, a personal digital assistant (PDA), a computer, or any other type of user device configured to operate in a wireless environment. When referred to, the term "base station" includes, but is not limited to, a Node B, a site controller, an access point (AP), or any other type of interfacing device configured to operate in a wireless environment.

In accordance with embodiments of the present disclosure, a UE may send an ESR (with service type set to mobile originated CS fallback) to the network in order to initiate a MO CSFB procedure. This may be true whether the UE is in idle mode or connected mode.

FIG. 1 illustrates an example message flow diagram showing the signaling flow for a MO CSFB according to embodiments of the present disclosure. In this example, the target RAT supports PS HO. It is noted that DTM may not mandatory for CS fallback to work and is not linked to PS HO. Referring to FIG. 1, ESR message 110 may be transmitted from UE/mobile station (MS) 101 to eNodeB 102 to initiate an MO CSFB procedure. UE/MS 101 may transmit ERS message 110 whether it is in idle mode or connected mode. ERS message 110 may then be relayed through base station subsystem (BSS)/radio network subsystem (RNS) 103 to mobile management entity (MME) 104. In some embodiments, ESR message 110 may include a service type set to MO CSFB. ESR message 110 may be encapsulated in one or more radio resource control (RRC) messages and S1 application protocol (S1AP) messages.

ESR message 110 with service type set to MO CSFB, also known as a CS fallback indicator, instructs MME 104 to perform circuit switched fallback. In one embodiment, UE/MS 101 may only transmit ESR 110 if it is attached to a circuit switched domain and is unable to initiate an IP multimedia subsystem (IMS) voice session, for example because UE/MS 101 is not IMS registered or IMS voice services are not supported, such as by UE/MS 101 or other network device.

In response to ESR message 110, MME 104 sends S1AP request message 115 eNodeB 102. S1AP request message 115 may include a CS fallback indicator. S1AP request message 115 message indicates to eNodeB 102 that UE/MS 101 should be moved from the current evolved UMTS terrestrial radio access network (E-UTRAN, a packet switched LTE network) to a UMTS terrestrial radio access network (UTRAN) or a GSM EDGE radio access network (GERAN) in order to establish a circuit switched connection. In response to receiving S1AP request message 115, eNodeB 102 may transmit S1AP response message 120.

At block 125, eNodeB 102 may optionally request a measurement report from UE/MS 101 to determine the target GERAN/UTRAN cell to which UE/MS 101 will be connected during the packet switched handover.

At block 130, eNodeB 102 may trigger packet switched handover (PS HO) to a GERAN/UTRAN neighbor cell by sending a handover required message to MME 104. As an example, this handover (HO) may be performed as will be understood to those of skill in the art. As part of this HO, UE/MS 101 receives a handover from E-UTRAN Command and tries to connect to a cell in the target radio access technology (RAT). The HO from E-UTRAN command may contain a CS fallback indicator that indicates to UE/MS 101 that the HO is triggered due to a CS fallback request. If the HO from E-UTRAN command contains a CS fallback indicator and UE/MS 101 fails to establish connection to the target RAT, then UE/MS 101 determines that CS fallback has failed. UE/MS 101 will determine that the CS fallback procedure is successfully completed when the PS-HO procedure is completed successfully. During the PS HO, the SGSN may not create a Gs association with the MSC/VLR. Service request procedure supervision timer can be sufficiently long considering the optional measurement reporting step.

If the target RAT is a UTRAN or a GERAN in Iu mode, UE/MS 101 may establish a CS signaling connection by sending an RRC initial direct transfer message that contains CM service request 135. The core network (CN) domain indicator may be set to "CS" in the initial direct transfer message. Alternatively, if the target RAT is a GERAN in A/Gb mode, UE/MS 101 establishes an RR connection (e.g., UE/MS 101 requests and may be assigned a dedicated channel where it sends a set asynchronous balanced mode (SABM) containing a layer 3 service request message to BSS/RSS 103 and BSS/RSS 103 responds by sending a UA.) Upon receiving the SABM (containing CM Service Request message), BSS/RSS 103 sends a COMPLETE LAYER 3 INFORMATION message, such as A/IuCS message 140, (containing the CM service request message) to mobile switching center (MSC) 105 that indicates CS resources have been allocated in a GERAN cell. After the establishment of the main signaling link, UE/MS 101 may enter either dual transfer mode or dedicated mode and the CS call establishment procedure is completed.

In the scenarios where the MSC serving the 2G/3G target cell is different from MSC 105 that served UE/MS 101 while it was serviced by the E-UTRAN, MSC 105 may reject the service request, transmitting CM service reject message 145 if implicit location update is not performed. CM service reject message 150 may then be transmitted to UE/MS 101. CM service reject message 150 may trigger UE/MS 101 to perform a location area update 155. If the target system operates in network mode of operation (NMO) I, the UE may perform a combined RA/LA update. In this case, the SGSN establishes a Gs association with the MSC/VLR, which replaces the SGs association with the MME. If the target system operates in NMO II or III, the UE performs a location area update towards the MSC. In this case, the MSC will release the SGs' association with the MME.

At block 160, UE/MS 101 may initiate the circuit switched call establishment procedure. After UE/MS 101 moves to a cell in the target RAT, the inter-RAT handover from E-UTRAN to UTRAN or GERAN, may be completed at block 165 and continuation of the execution phase may proceed. At the end of this handover UE/MS 101 may trigger a routing area update procedure when the sending of uplink packet data is possible.

Note that if packet switched handover is not supported in the target RAT, UE/MS's 101 packet switched sessions may be suspended. In this case, once the circuit switched call is terminated, UE/MS 101 may return to E-UTRAN and resume its packet switched sessions. Note also that UE/MS 101 may initiate a CSFB procedure for circuit switched emergency calls by setting the service type to 'mobile originating CS fallback emergency call' or '1xCS fallback emergency call'.

Figure 2:
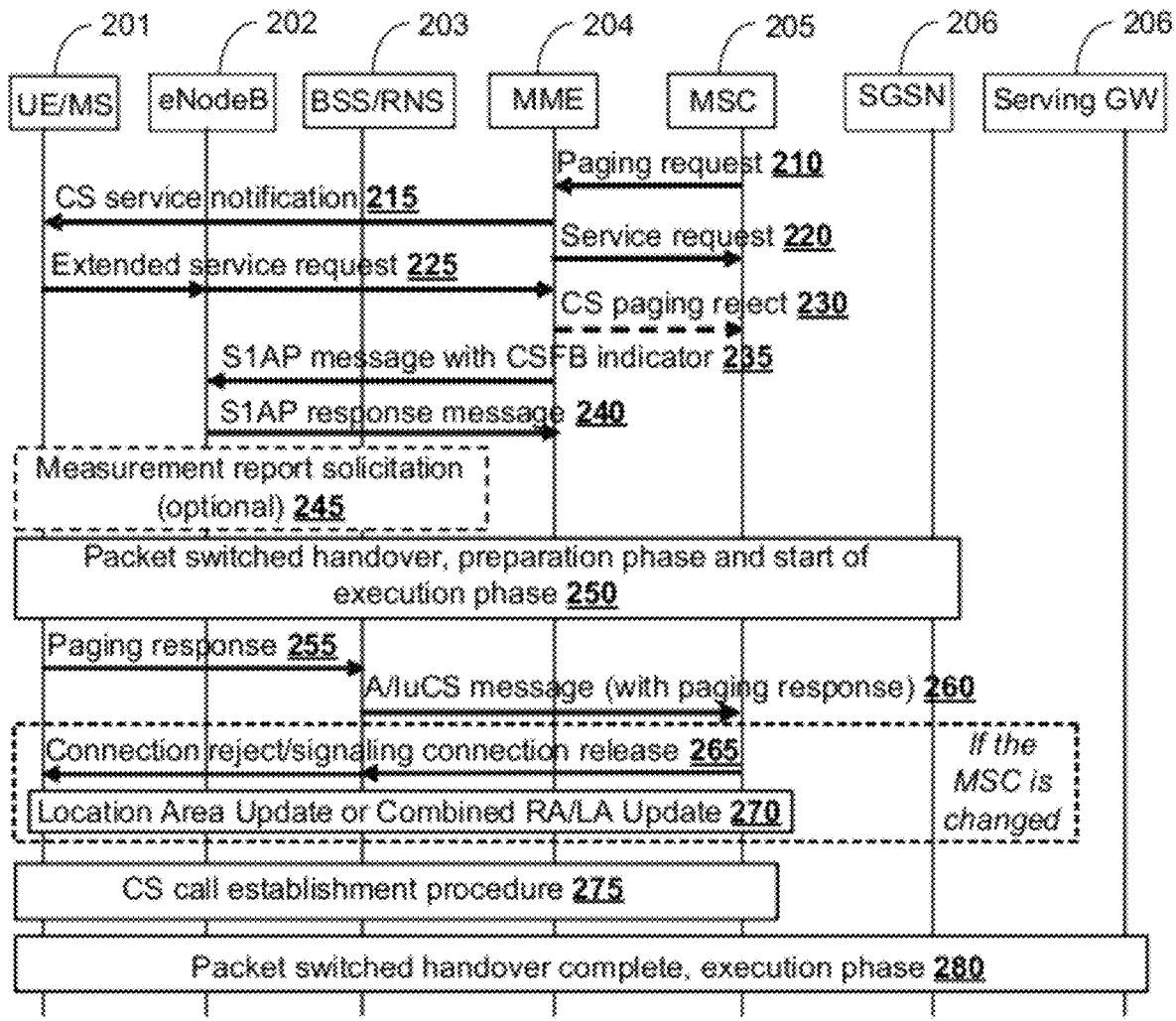
FIG. 2 illustrates a message flow diagram of LTE mobile terminated CSFB (MT CSFB) signaling that may be implemented according to embodiments of the present disclosure.

If the UE is idle and the network wishes to inform the UE of an MT CSFB request, the network sends a paging message. On the other hand, if the network wishes to inform the UE of a MT CSFB request while the UE is active, the network sends a CS service notification (dedicated NAS message). Both of these processes trigger an ESR from the UE which specifically state MT CSFB service type. FIG. 2 illustrates a message flow diagram of LTE MT CSFB signaling that may be implemented according to embodiments of the present disclosure. If UE/MS 201 is idle and the network wishes to inform UE/MS 201 of an MT CSFB request, the network sends a paging message. On the other hand, if the network wishes to inform UE/MS 201 of a MT CSFB request while UE/MS 201 is active, the network sends a CS service notification (dedicated NAS message). Both of these processes trigger an ESR from UE/MS 201 which specifically contains an MT CSFB service type. In FIG. 2, UE/MS 201 may be originally in active mode and the target RAT may support PS HO.

Referring to FIG. 2, MSC 205 may receive an incoming voice call and respond by sending paging request 210 (e.g. IMSI or TMSI, optional caller line identification and connection management information, CS call indicator) to MME 204 over an LTE SGs interface between MSC 205 and MME 204. MME 204 transmits CS service notification 215 through eNodeB 202 to UE/MS 201. The CS service notification contains CN domain indicator and, if received from the MSC, the caller line identification. The MSC only sends a CS page for a UE that provides location update information using the SGs interface. In the active mode, the MME has an established S1 connection and if the MME did not return the "SMS-only" indication to the UE during attach or combined TA/LA update procedures, the MME reuses the existing connection to relay the CS page to the UE.

MME 204 immediately sends SGs service request message 220 to MSC 205 containing an indication that UE/MS 201 was in connected mode. MSC 205 uses this connected mode indication to start the call forwarding on no reply timer for UE/MS 201 and MSC 205 should send an indication of user alerting to the calling party. Receipt of SGs service request message 220 stops MSC 205 from retransmitting the SGs interface paging message.

Responsive to receiving CS service notification 215, UE/MS 201 may send ESR (CS fallback indicator, reject or accept) message 225 to MME 204. ESR message 204 may be encapsulated in RRC and S1AP messages. A CS fallback indicator instructs MME 204 to perform CS fallback. Note that UE/MS 201 may decide to reject CSFB based on caller line identification. If so, ESR message 225, containing CSFB reject, may instruct MME 204 to send CS paging reject 230 to MSC 205 to stop CS paging procedure, thus terminating the CSFB procedure.

Further, it is noted that this procedure can also take place immediately after MSC receives MAP_PRN from HSS, if pre-paging is deployed. Caller line identification and CS call indicator are also provided in the case of pre-paging. If CSFB is accepted by UE/MS 201, MME 204 sends S1AP request message 235 to eNodeB 202 that includes UE/MS 201 radio capabilities and a CS fallback indicator. S1AP Request message 235 indicates to eNodeB 202 that UE/MS 201 should be moved to UTRAN/GERAN. eNodeB 202 replies with S1AP response message 240.

At block 245, eNodeB 202 may optionally request a measurement report from UE/MS 201 to determine the target GERAN/UTRAN cell to which UE/MS 201 will be connected during the packet switched handover.

At block 250, eNodeB 202 triggers packet switched handover (PS HO) to a GERAN/UTRAN neighbor cell by sending a handover required message to MME 204. In the following, an inter-RAT handover from E-UTRAN to UTRAN or GERAN begins. As part of this handover, UE/MS 201 receives a HO from E-UTRAN command and tries to connect to a cell in the target RAT. The HO from E-UTRAN command may contain a CS fallback indicator which indicates to UE/MS 201 that the HO is triggered due to a CS fallback request. If the HO from E-UTRAN command contains a CS fallback indicator and UE/MS 201 fails to establish connection to the target RAT, then UE/MS 101 determines that CS fallback has failed. UE/MS 201 may determine that the CS fallback procedure is successfully completed when the PS-HO procedure is completed successfully. It is noted that during the PS HO, the SGSN does not create a Gs association with the MSC/VLR.

If the target RAT is UTRAN or GERAN Iu mode, UE/MS 201 establishes an RRC connection and responds to the paging by sending RRC paging response 255. The CN domain indicator may be set to "CS" in the initial direct transfer message. If the target RAT is GERAN A/Gb mode, UE/MS 201 establishes an RR connection and suitably responds to paging (i.e., UE/MS 201 may request and be assigned a dedicated channel where it sends a SABM containing a paging response to BSS/RNS 203 and BSS/RNS 203 responds by sending a UA). Upon receiving the SABM (containing a Paging Response message), BSS/RNS 203 sends a COMPLETE LAYER 3 INFORMATION message, such as such as A/IuCS message 260 (containing a Paging Response message) to MSC 205 that indicates CS resources have been allocated in the GERAN cell. After the establishment of the main signaling link, UE/MS 201 may enter either dual transfer mode or dedicated mode and the CS call establishment procedure may be completed. It is noted that the BSS should be prepared to receive a paging response even when the corresponding paging request has not been sent by this BSS.

If the MSC serving the 2G/3G target cell is different from MSC 205 that served UE/MS 201 on the E-UTRAN, MSC 205 can reject the paging response message by transmitting connection reject/release message 265, releasing the Iu connection for UTRAN or the A/Gb connection for GERAN. The BSC/RNC in turn releases the signaling connection for UTRAN or GERAN CS domain. The signaling connection release may trigger UE/MS 201 to perform location area update 270. For example, if the target system operates in NMO I, the UE may perform a combined RA/LA update. In this case, the SGSN establishes a Gs association with the MSC/VLR, which replaces the SGs association with the MME. If the target system, operates in NMO II or III, the UE performs a location area update towards the MSC. In this case, the MSC will release the SGs association with the MME. The location area update may trigger the roaming retry for the CS fallback procedure.

At block 275, UE/MS 201 may initiate the circuit switched call establishment procedure. After UE/MS 201 moves to a cell in the target RAT, the inter-RAT handover from E-UTRAN to UTRAN or GERAN, may be completed at block 280 and continuation of the execution phase may proceed. At the end of this handover, UE/MS 201 may trigger a routing area update procedure when the sending of uplink packet data is possible.

In the present disclosure, techniques for handling or managing various example cases described below are provided. It is noted that in these example cases, the ability to perform PS HO is assumed. However, the embodiments disclosed herein are valid for cases where PS HO are not supported.

Example Case 1

Figure 3:
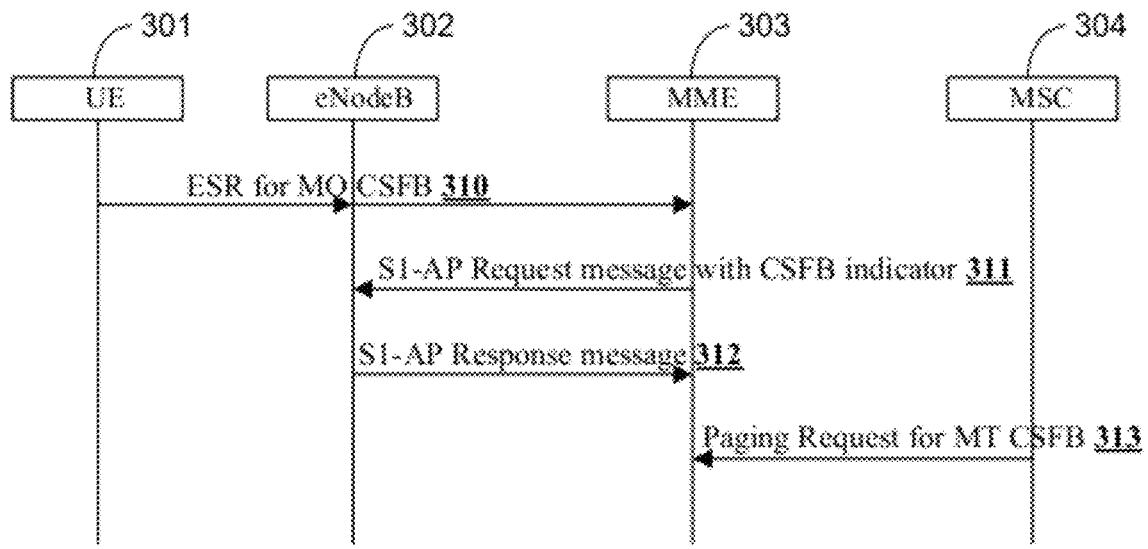
FIG. 3 illustrates a message flow diagram of an example technique for handling simultaneous-pending MO and MT CSFB requests according to embodiments of the present disclosure.

Since the signaling for CS calls/service may be performed by LTE devices, at any given moment, only a subset of the involved nodes (i.e., UE/MS, MME, MSC) may be aware of the ongoing CSFB request, whether it be MO or MT. Due to this, it is possible that a second CSFB request (e.g., an MO request in the case where the original request was MT or vice versa) may be triggered and as such there may be a conflict as to how to deal with both MO and MT requests simultaneously. In these cases, one of the nodes (UE, MME or MSC) may receive unexpected messages when it anticipated a specific type of message. FIG. 3 illustrates a message flow diagram of one such situation according to embodiments of the present disclosure.

Referring to FIG. 3, MME 303 first receives an ESR 310 from UE 301 for MO CSFB. MME 303 suitably begins treating the request. After transmitting S1AP request message 311 with a CSFB indicator to eNodeB 302 and receiving S1AP response message 312 from eNodeB 302 in response, but some time before the HO command is sent, MME 303 may receive paging request 313 from MSC 304 indicating that there is also an MT CSFB request for UE 301. As is described in more detail herein, embodiments of the present disclosure provide means to decide which request should be performed and how all the nodes should be informed.

Example Case 2

Figure 4:
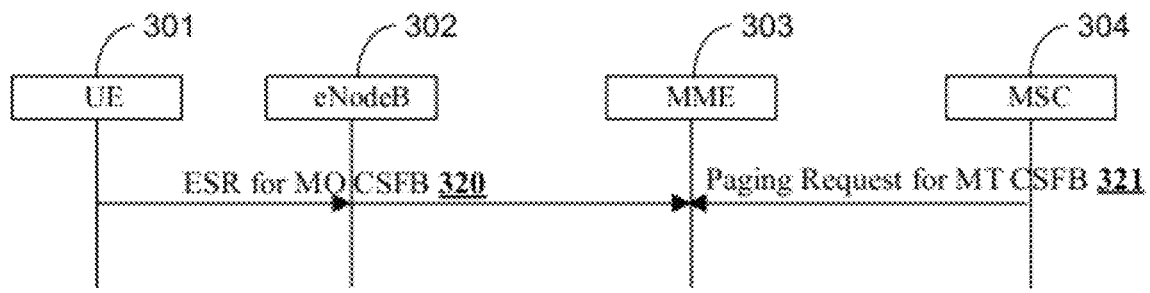
FIG. 4 illustrates a message flow diagram of an example case of simultaneously arriving MO CSFB and MT CSFB requests according to embodiments of the present disclosure.

In FIG. 4, both ESR 320 containing an MO CSFB request and paging request 321 containing an MT CSFB request arrive at MME 303 before MME 303 has performed the required next step for either request. As is described in more detail herein, embodiments of the present disclosure provide means to decide which request should be handled and how all the nodes should be informed of the decision. This may prevent any effects of keeping some nodes uninformed and prevent confusion when the inter-system change is performed.

Example Case 3

Figure 5:
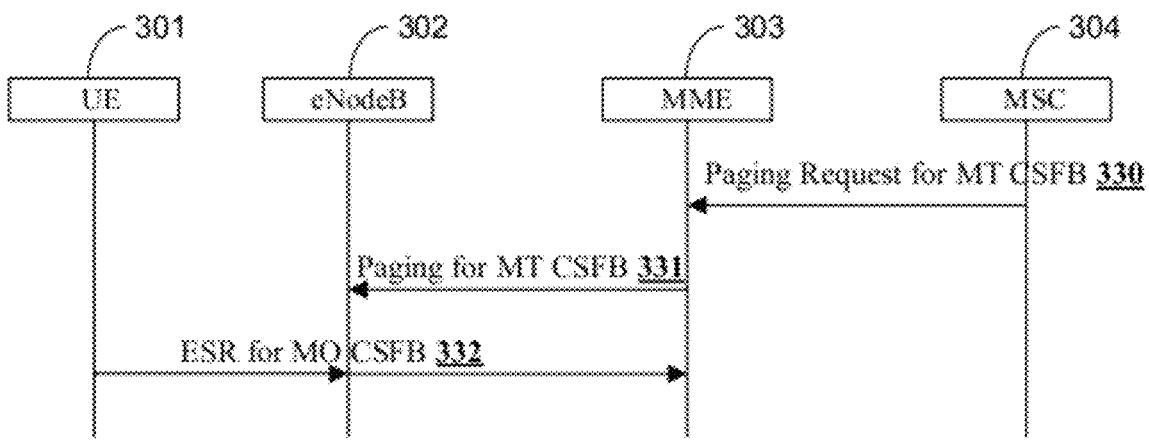
FIG. 5 illustrates a message flow diagram of an example case of an MT CSFB request reaching an MME according to embodiments of the present disclosure.

In FIG. 5, paging request 330 containing an MT CSFB request reaches MME 303, which may then proceed to transmit paging message 331 to eNodeB 302 if UE 301 is in idle mode. Alternatively, MME 303 may send a CS service notification if UE 301 is in active/connected mode. However, before UE 301 receives the MT CSFB request, UE 301 begins its own MO CSFB procedure by sending ESR 332 to MME 303. MME 303 then receives ESR 332 (as it expected from the notification sent to UE 301), however ESR 332 includes a service type set to 'mobile originated CS fallback' (or other value that does not correspond to MT CSFB, e.g. in the case of emergency calls). Meanwhile, at UE 301 there are two possible results. First, if UE 301 was originally idle, it may no longer receive the paging message from eNodeB 302 since it is now active. Second, if UE 301 was originally active, it may now receive a CS service notification for MT CSFB and not the expected response to ESR 332 for MO CSFB. In this scenario, it may be unclear how either MME 303 or UE 301 will react. Furthermore, it may also be unclear what the consequences of such actions may have after an inter-system change is performed. For example, if MME 303 decides to ignore the MO CSFB request and continue as though only the MT CSFB request were valid, without informing UE 301, there may be a conflict in the CS domain when UE 301 sends the CM service request to MSC 304 when in fact MSC 304 was expecting a paging response.

Example Case 4

In another example case, UE 301 may receive a paging (RRC) message (or CS service notification if UE 301 is in active mode) for a MT CSFB request just as it was intending to send ESR 332 for a MO CSFB request for an emergency call. In this case, the manner in which the network responds to the MO CSFB request may impact the ability of UE 301 to perform its emergency call.

Example Case 5

Lastly, the UE may have started an MO-SMS request at the moment that it receives the paging (RRC) in E-UTRAN. As the UE falls back to GERAN/UTRAN, it can also happen that the location area identity of the target RAT does not match the one stored on the UE's USIM. Therefore, the UE needs to start with a location update procedure in the target RAT (GERAN/UTRAN). It is possible that this new location area belongs to a new MSC/VLR. It has already been agreed in CT1 that the UE can send both the CSMT flag (in order to notify the network that it has been paged in E-UTRAN) as well as the "follow on request" parameter (in order to indicate to the network that it has an MO request from the CM sub-layer). The UE may send both parameters and it will be up to the network, as an implementation option, which one to prioritize. This means that the network will have the option of continuing with the MO request (i.e. SMS) and then, upon completion of that, start the MT call setup signaling. This choice for the network may, however, result into a long delay for the MT call or in some cases even a dropped call.

Figure 6:
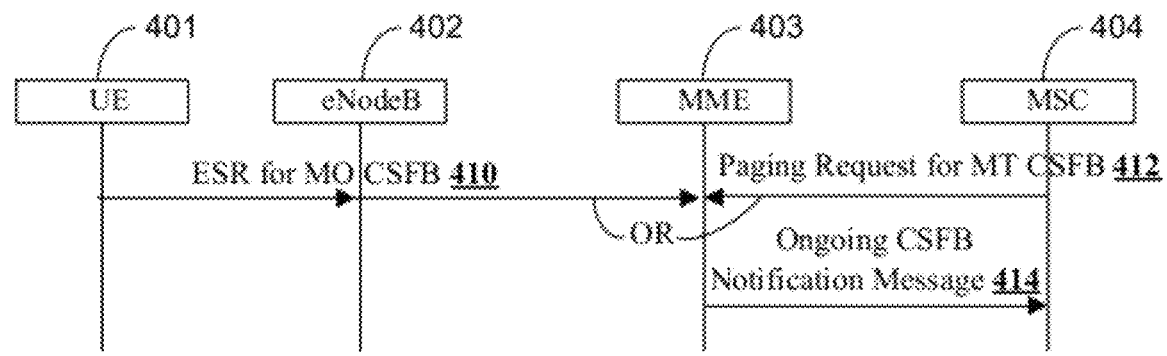
FIG. 6 illustrates a message flow diagram of an example technique for handling MO CSFB and MT CSFB requests according to embodiments of the present disclosure.

In the cases set forth above in regard to FIGS. 3-5, several implementations of the present disclosure may solve the problems presented by such situations. FIG. 6 illustrates one such embodiment. In this embodiment, MME 403 informs the MSC 404 about an ongoing CSFB procedure (initiated by either ESR 410 or paging request 412) by transmitting ongoing CSFB notification message 414. Ongoing CSFB notification message 414 may be a new message transmitted over the SGs interface between MME 403 and MSC 404. Alternatively, ongoing CSFB notification message 414 may be an SGs' AP-SERVICE-REQUEST that re-uses existing information elements (IEs) such as UE unreachable, mobile terminating CS fallback call rejected by the user. In another embodiment, a new IE can be defined and used with an SGsAP-SERVICE-REQUEST to provide an indication of an ongoing CSFB procedure to MSC 404. In yet another embodiment, ongoing CSFB notification message 414 may be an SGsAP-PAGING-REJECT transmitted to MSC 404 and using existing IE or a new IE to provide any specific information, such as an indication of an ongoing MO CSFB or ongoing MO emergency CSFB. MME 403 can send ongoing CSFB notification message 414 in the form of an SGsAP-PAGING-REJECT directly after receiving paging request 412 from MSC 404 or after MSC 404 first replies with SGsAP-SERVICE-REQUEST.

When MSC 404 receives ongoing CSFB notification message 414, MSC 404 can initiate a call forwarding procedure or trigger a user determined user busy (UDUB) action. Alternatively, MSC 404 can send the ringing tone to the other caller, or take other actions depending on whether or not the ongoing CSFB is an MO CSFB for emergency call or for other services.

In one embodiment, MME 403 informs MSC 404 about any MO CSFB procedure regardless of whether an MT CSFB is triggered at approximately the same time. By doing so, MSC 404 can take certain actions such as preventing or stopping any forwarding of SMS messages to MME 403 and resuming such CS services when UE 401 returns to the CS domain. Again, this can be achieved with a new message over the SGs interface or by re-using the SGsAP-SERVICE-REQUEST with new IE or existing IE if applicable.

In accordance with embodiments of the present disclosure, an MME can detect one or more pending CSFB requests. In response to detecting the one or more pending CSFB requests, the MME can generate a message that indicates the pending CSFB request(s). Further, the MME may communicate the message to one of an MSC and a VLR. It should be understood that a pending CSFB request may be an MO CSFB request or an MT CSFB request. The CSFB requests may be simultaneously-pending, for example two or more CSFB requests may have been established such that they are pending at the same time, or for example, one CSFB request may be established and the other is arriving.

Figure 7:
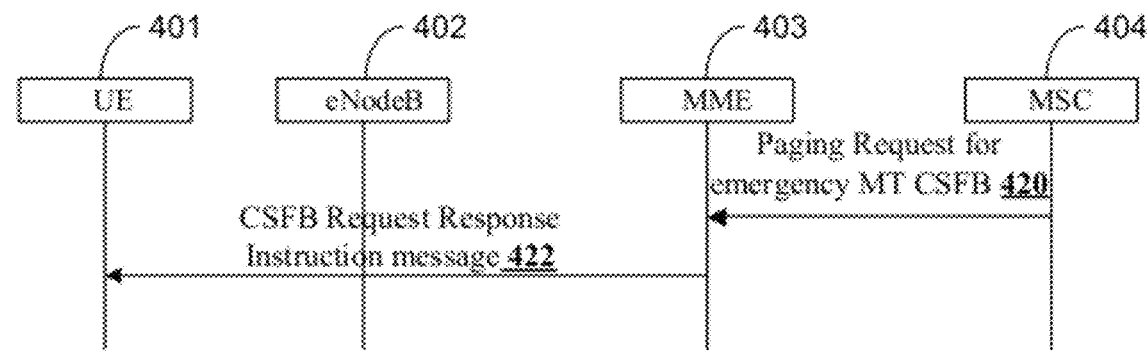
FIG. 7 illustrates a message flow diagram of an example technique for handling paging request received at an MME for an MT CSFB emergency call request according to embodiments of the present disclosure.

FIG. 7 illustrates an alternative embodiment of the present disclosure where paging request 420 received at MME 403 from MSC 404 may be for an MT CSFB emergency call request, or for any other specific type of CSFB request. In this embodiment, MME 403 informs UE 401 about which specific request (i.e., MT or MO) should be pursued in the target RAT environment regardless of what UE 401 has requested.

This may be implemented in one embodiment by MME 403 transmitting CSFB request response instruction message 422 to UE 401. CSFB request response instruction message 422 may inform UE 401 that, for example, it should transmit a paging response (instead of a CM service request, or vice versa, or any other initial message) upon entering the target RAT. CSFB request response instruction message 422 may take the form of a new RRC message, or it may be in the form of an existing RRC message, such as the MobilityFromE-UTRA command or RRC connection release, using a new IE. CSFB request response instruction message 422 may implicitly inform UE 401 that its MO/MT CSFB request will not be handled due to a higher priority MT/MO CSFB request, or that UE 401 should abort the MO/MT CSFB procedure and instead send a paging response/CM service request (or other NAS/RRC) messages when the inter-system change is completed.

In an alternative embodiment, MME 403 indicates to UE 401 via CSFB request response instruction message 422 the procedure to be used to override a current request from UE 401. Alternatively, the MME 403 may send a CS service notification message with a new IE that may be optionally included in such a scenario. This new IE can indicate either what message should be sent in the target RAT or what procedure MME 403 has chosen to override UE's 401 request (e.g., MT CSFB or LCS overrides the UE's 401 request whatever that may be.) In such cases, UE 401 can adjust to send the necessary/expected initial NAS message accordingly when in the target RAT.

Alternatively, MME 403 can take no new actions and respond to the individual requests from UE 401 and MSC 404 as expected, thereby leaving it up to UE 401 and/or MSC 404 to resolve the issue upon inter-system change. If MSC 404 receives a different message from the expected (e.g. CM service request instead of paging response), it may elect to reject the CM Service Request and continue with the MT CS call. Alternatively, MSC 404 may handle the MO CS call and then once that call is operational, it may use call waiting to make UE 401 aware of the MT CS call.

Figure 8:
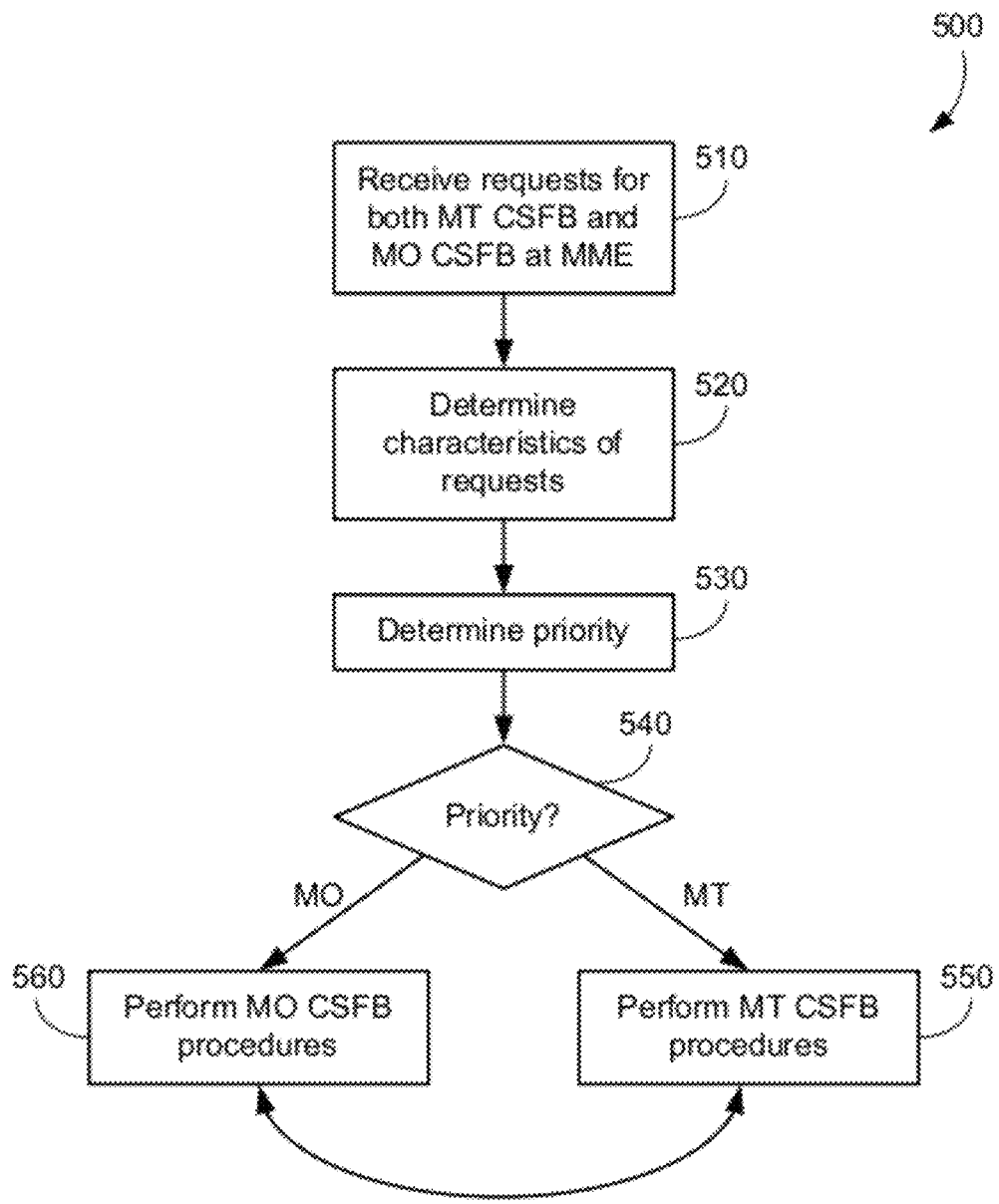
FIG. 8 illustrates a flow chart of an example method 500 of handling simultaneous MT and MO CSFB requests at an MME according to embodiments of the present disclosure.

FIG. 8 illustrates a flow chart of an example method 500 of implementing another embodiment of the present disclosure. In this embodiment, an MME may give priority to one of the two CSFB request call requests (i.e., MT or MO) based on a service type, network/operator configurations, or the timing of the receipt of the request (e.g. first request received gets priority.) At block 510, an MME may receive a request for MO CSFB and a request for MT CSFB relatively close in time. At block 520, the MME may obtain or determine certain characteristics of the requests that will allow the MME to determine a priority of each of the two requests, which may be performed at block 530. At block 540, a decision may be made as to which request has priority. If the MME determines that MT CSFB has priority, then MT CSFB procedures as described herein may be performed at block 550. If the MME determines at block 540 that MO CSFB has priority, then at block 560 MO CSFB procedures may be performed. Note that after the higher priority CSFB procedures are performed, the method may proceed to performing the procedures of the CSFB that was lower in priority.

In still another embodiment, it is contemplated that an MME may send the CS service notification to a UE that has sent an ESR for MO CSFB. The UE's behavior can be such that it uses the latest notification message and aborts other ongoing CSFB procedures. The UE may then confirm this by sending an ESR and setting the service type according to the last notification received. Alternatively, a user's input may be requested by the UE in order to decide whether to continue with an MO or an MT CSFB requests. In yet another alternative, a UE might be configured to continue with one request over the other based on network or user policies/settings (including priority settings), or based on a service type (e.g., the UE can give priority to the CSFB request for emergency purposes, etc.)

Delays Due to UE Detach When No Bearers are Established as Part of Service Request (also when UE Sends ESR)

During UE behavior when none of the bearers are established during the service request procedure, the UE can perform a local detach, enter state EMM-DEREGISTERED, and initiate an attach procedure. If this occurs when the UE sends the ESR from idle mode, then having to go through the detach and attach procedure can put further delay on the CSFB and hence CS call. In any case, the UE should consider itself as deregistered and so there is no point to put the CSFB on hold and then re-attach again.

The embodiments described herein may apply to other CS services that require CSFB, e.g., supplementary services or location services. System and method embodiments are described for any combination of the cases above, i.e. the solutions can apply to several cases listed above. According to an aspect, the MME informs the MSC/VLR about an ongoing CSFB procedure. This can be achieved by using a new message over the SGs interface. Alternatively, this can be done by using the SGs AP-SERVICE-REQUEST that re-uses existing information elements (IEs) such as UE unreachable, mobile terminating CS fallback call rejected by the user. Otherwise, a new IE can be defined to provide such an indication to the MSC/VLR. As another option, the MME can send the SGsAP-PAGING-REJECT to the MSC/VLR and re-use existing IE or use a new IE to provide any specific information e.g. ongoing MO CSFB, or ongoing MO emergency CSFB. The MME can send the SGsAP-PAGING-REJECT directly after receiving the paging request from the MSC/VLR or after it first replies with SGsAP-SERVICE-REQUEST.

When the MSC receives this indication, it can start call forwarding procedure or trigger a user determined user busy (UDUB), or can send the ringing tone to the other caller, etc, depending on whether or not the MO CSFB is for emergency call, or for other services.

The MME may always inform the MSC/VLR about any MO CSFB procedure regardless if a MT CSFB is triggered at around the same time. By doing so, the MSC/VLR can take certain actions such as stop forwarding any SMS to the MME and continue such CS services when the UE goes to the CS domain. This can be achieved with a new message over the SGs interface or by re-using the SGsAP-SERVICE-REQUEST with new IE or existing IE if applicable.

According to an aspect, if the MT CSFB call request is for emergency, or for any other type of CSFB request, it is proposed that the MME informs the UE about what request i.e. MT or MO, should be pursued in the target RAT regardless of what the UE has requested. This can be achieved in several ways. For example, the MME may inform the UE that e.g. it should transmit a paging response (instead of a CM service request, or vice versa, or any other initial message) upon entering the target RAT. This indication may be accomplished by means of a new RRC message, or it may be included as a new IE in existing RRC messages such as the MobilityFromE-UTRA command or RRC connection release. This message implicitly informs the UE that its MO/MT CSFB request will not be handled due to a higher priority MT/MO CSFB request, or that the UE should abort the MO/MT CSFB procedure and instead send a Paging response/CM Service request (or other NAS/RRC) messages when the inter-system change is completed. The MME indicates to the UE what procedure is to override the current request from the UE, e.g., by sending the CS Service Notification message with a new IE that is optionally included in such cases. The new IE can indicate either what message should be sent in the target RAT or what procedure the MME has chosen to override the UE's request e.g. MT CSFB or LCS overrides the UE's request (whatever that request is). In such cases, the UE can adjust to send the necessary/expected initial NAS message accordingly when in the target RAT.

In another aspect, the MME can take no new actions and responds to the individual requests (i.e. from the UE and the MSC/VLR) as expected, thereby leaving it up to the UE and/or the MSC/VLR to resolve the issue upon inter-system change. If the MSC/VLR receives a different message from the expected (e.g. CM service request instead of paging response), it may elect to reject the CM service request and continue with the MT CS call. Alternatively, it may handle the MO CS call and then once that call is operational, it may use call waiting to make the UE aware of the MT CS call.

According to another aspect, the MME can optionally always give priority to one of the calls, i.e., the MT or MO based on service type or network/operator configurations, or based on what request arrived first. It is also proposed that the MME sends the CS service notification to a UE that has sent an ESR for MO CSFB. The UE's behavior can be such that it uses the latest notification message and aborts other ongoing CSFB procedures. The UE might then confirm this by sending an ESR and setting the service type according to the last notification received. Alternatively, the user's input is request in order to decide to continue with the MO or MT CSFB requests. Alternatively, the UE might be configured to always continue with one request over the other based on network or user policies/settings, or based on service type (e.g., the UE can always give priority to the CSFB request for emergency purposes).

According to another aspect, it is disclosed herein that when the UE falls back to GERAN/UTRAN, it will only include the "CSMT" flag (and not include the "follow on request") in the location updating request message, hence prioritizing the MT call. Doing so, the network will only continue with the MT call setup upon the completion of the location update and the SMS traffic can be requested and delivered by the UE at a later stage. In yet another embodiment, the UE may send both flags, i.e. the "CSMT" and "follow on request," to the network in the location updating request message. In this case, the network can ignore the "follow on request" flag and continue with the MT call setup.

According to an aspect, an embodiment provides that if the UE sends an ESR from idle mode and at least the default bearer (corresponding to the default EPS bearer context) is not established, then the UE considers itself as deregistered (i.e. enters state EMM-DEREGISTERED). The UE can also perform local detach, however, the UE may not initiate the attach procedure. Instead, the UE reselects to the CS domain and continues directly with the CSFB procedure (i.e., CS call or other CS service, e.g. LCS). The UE need not initiate the attach procedure in the CS domain. The UE for example, can directly send the CS service request if the CSFB is due to MO CS call request or send the paging response if the CSFB is due to MT CS call request. The UE can then register to the PS domain of the legacy system, i.e., SGSN. Moreover, the UE can locally deactivate ISR if it was activated while in LTE. The UE can later register to the LTE network when it is returns to LTE.

EXEMPLARY ENVIRONMENTS

Figure 9:
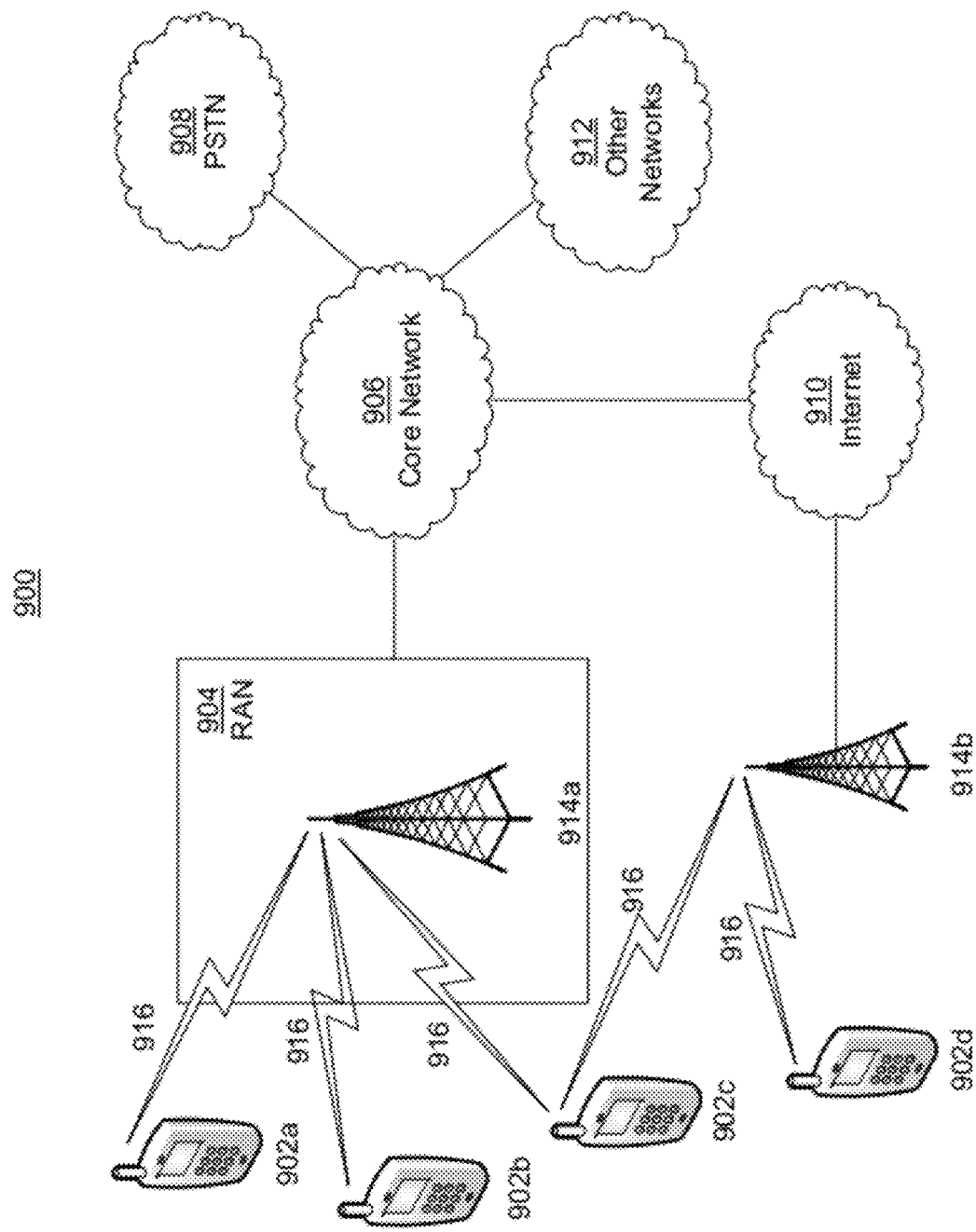
FIG. 9 is a system diagram of an example communications system in which one or more disclosed embodiments may be implemented.

FIG. 9 is a diagram of an example communications system 900 in which one or more disclosed embodiments may be implemented. The communications system 900 may be a multiple access system that provides content, such as voice, data, video, messaging, broadcast, etc., to multiple wireless users. The communications system 900 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 9, the communications system 900 may include wireless transmit/receive units (WTRUs) 902a, 902b, 902c, 902d, a radio access network (RAN) 904, a core network 906, a public switched telephone network (PSTN) 908, the Internet 910, and other networks 912, though it will be appreciated that the disclosed embodiments contemplate any number of WTRUs, base stations, networks, and/or network elements. Each of the WTRUs 902a, 902b, 902c, 902d may be any type of device configured to operate and/or communicate in a wireless environment. By way of example, the WTRUs 902a, 902b, 902c, 902d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 900 may also include a base station 914a and a base station 914b. Each of the base stations 914a, 914b may be any type of device configured to wirelessly interface with at least one of the WTRUs 902a, 902b, 902c, 902d to facilitate access to one or more communication networks, such as the core network 906, the Internet 910, and/or the networks 912. By way of example, the base stations 914a, 914b may be a base transceiver station (BTS), a Node-B, an eNode B, a Home Node B, a Home eNode B, a site controller, an access point (AP), a wireless router, and the like. While the base stations 914a, 914b are each depicted as a single element, it will be appreciated that the base stations 914a, 914b may include any number of interconnected base stations and/or network elements.

The base station 914a may be part of the RAN 904, which may also include other base stations and/or network elements (not shown), such as a base station controller (BSC), a radio network controller (RNC), relay nodes, etc. The base station 914a and/or the base station 914b may be configured to transmit and/or receive wireless signals within a particular geographic region, which may be referred to as a cell (not shown). The cell may further be divided into cell sectors. For example, the cell associated with the base station 914a may be divided into three sectors. Thus, in one embodiment, the base station 914a may include three transceivers, i.e., one for each sector of the cell. In another embodiment, the base station 914a may employ multiple-input multiple output (MIMO) technology and, therefore, may utilize multiple transceivers for each sector of the cell.

The base stations 914a, 914b may communicate with one or more of the WTRUs 902a, 902b, 902c, 902d over an air interface 916, which may be any suitable wireless communication link (e.g., radio frequency (RF), microwave, infrared (IR), ultraviolet (UV), visible light, etc.). The air interface 916 may be established using any suitable radio access technology (RAT).

More specifically, as noted above, the communications system 900 may be a multiple access system and may employ one or more channel access schemes, such as CDMA, TDMA, FDMA, OFDMA, SC-FDMA, and the like. For example, the base station 914a in the RAN 904 and the WTRUs 902a, 902b, 902c may implement a radio technology such as Universal Mobile Telecommunications System (UMTS) Terrestrial Radio Access (UTRA), which may establish the air interface 916 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 914a and the WTRUs 902a, 902b, 902c may implement a radio technology such as Evolved UMTS Terrestrial Radio Access (E-UTRA), which may establish the air interface 916 using Long Term Evolution (LTE) and/or LTE-Advanced (LTE-A).

In other embodiments, the base station 914a and the WTRUs 902a, 902b, 902c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 914b in FIG. 9 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 914b and the WTRUs 902c, 902d may implement a radio technology such as IEEE 802.11 to establish a wireless local area network (WLAN). In another embodiment, the base station 914*b* and the WTRUs 902*c*, 902*d* may implement a radio technology such as IEEE 802.15 to establish a wireless personal area network (WPAN). In yet another embodiment, the base station 914*b* and the WTRUs 902*c*, 902*d* may utilize a cellular-based RAT (e.g., WCDMA, CDMA2000, GSM, LTE, LTE-A, etc.) to establish a picocell or femtocell. As shown in FIG. 9, the base station 914*b* may have a direct connection to the Internet 910. Thus, the base station 914*b* may not be required to access the Internet 910 via the core network 106.

The RAN 904 may be in communication with the core network 906, which may be any type of network configured to provide voice, data, applications, and/or voice over internet protocol (VoIP) services to one or more of the WTRUs 902*a*, 902*b*, 902*c*, 902*d*. For example, the core network 906 may provide call control, billing services, mobile location-based services, pre-paid calling, Internet connectivity, video distribution, etc., and/or perform high-level security functions, such as user authentication. Although not shown in FIG. 9, it will be appreciated that the RAN 904 and/or the core network 906 may be in direct or indirect communication with other RANs that employ the same RAT as the RAN 904 or a different RAT. For example, in addition to being connected to the RAN 904, which may be utilizing an E-UTRA radio technology, the core network 906 may also be in communication with another RAN (not shown) employing a GSM radio technology.

The core network 906 may also serve as a gateway for the WTRUs 902*a*, 902*b*, 902*c*, 902*d* to access the PSTN 908, the Internet 910, and/or other networks 912. The PSTN 908 may include circuit-switched telephone networks that provide plain old telephone service (POTS). The Internet 910 may include a global system of interconnected computer networks and devices that use common communication protocols, such as the transmission control protocol (TCP), user datagram protocol (UDP) and the internet protocol (IP) in the TCP/IP internet protocol suite. The networks 912 may include wired or wireless communications networks owned and/or operated by other service providers. For example, the networks 912 may include another core network connected to one or more RANs, which may employ the same RAT as the RAN 904 or a different RAT.

Some or all of the WTRUs 902*a*, 902*b*, 902*c*, 902*d* in the communications system 900 may include multi-mode capabilities, i.e., the WTRUs 902*a*, 902*b*, 902*c*, 902*d* may include multiple transceivers for communicating with different wireless networks over different wireless links. For example, the WTRU 902*c* shown in FIG. 9 may be configured to communicate with the base station 914*a*, which may employ a cellular-based radio technology, and with the base station 914*b*, which may employ an IEEE 802 radio technology.

Figure 10:
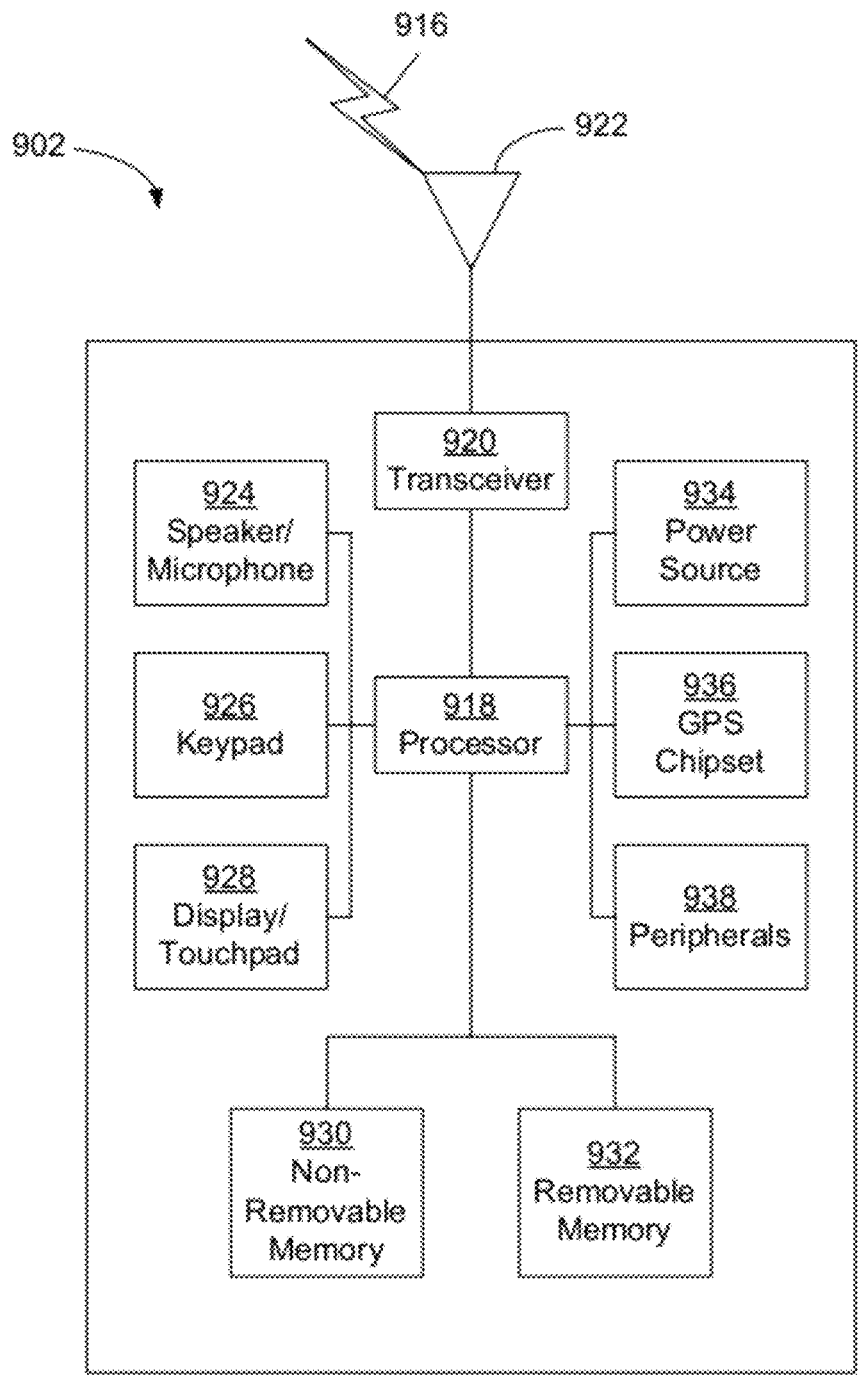
FIG. 10 is a system diagram of an example wireless transmit/receive unit (WTRU) that may be used within the communications system illustrated in FIG. 9.

FIG. 10 is a system diagram of an example WTRU 902. As shown in FIG. 10, the WTRU 902 may include a processor 918, a transceiver 920, a transmit/receive element 922, a speaker/microphone 924, a keypad 926, a display/touchpad 928, non-removable memory 906, removable memory 932, a power source 934, a global positioning system (GPS) chipset 936, and other peripherals 938. It will be appreciated that the WTRU 902 may include any sub-combination of the foregoing elements while remaining consistent with an embodiment.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 10 depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station (e.g., the base station 914*a*) over the air interface 916. For example, in one embodiment, the transmit/receive element 922 may be an antenna configured to transmit and/or receive RF signals. In another embodiment, the transmit/receive element 922 may be an emitter/detector configured to transmit and/or receive IR, UV, or visible light signals, for example. In yet another embodiment, the transmit/receive element 922 may be configured to transmit and receive both RF and light signals. It will be appreciated that the transmit/receive element 922 may be configured to transmit and/or receive any combination of wireless signals.

In addition, although the transmit/receive element 922 is depicted in FIG. 10 as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 916.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as UTRA and IEEE 802.11, for example.

The processor 918 of the WTRU 102 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 906 and/or the removable memory 932. The non-removable memory 906 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 916 from a base station (e.g., base stations 914a, 914b) and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11:
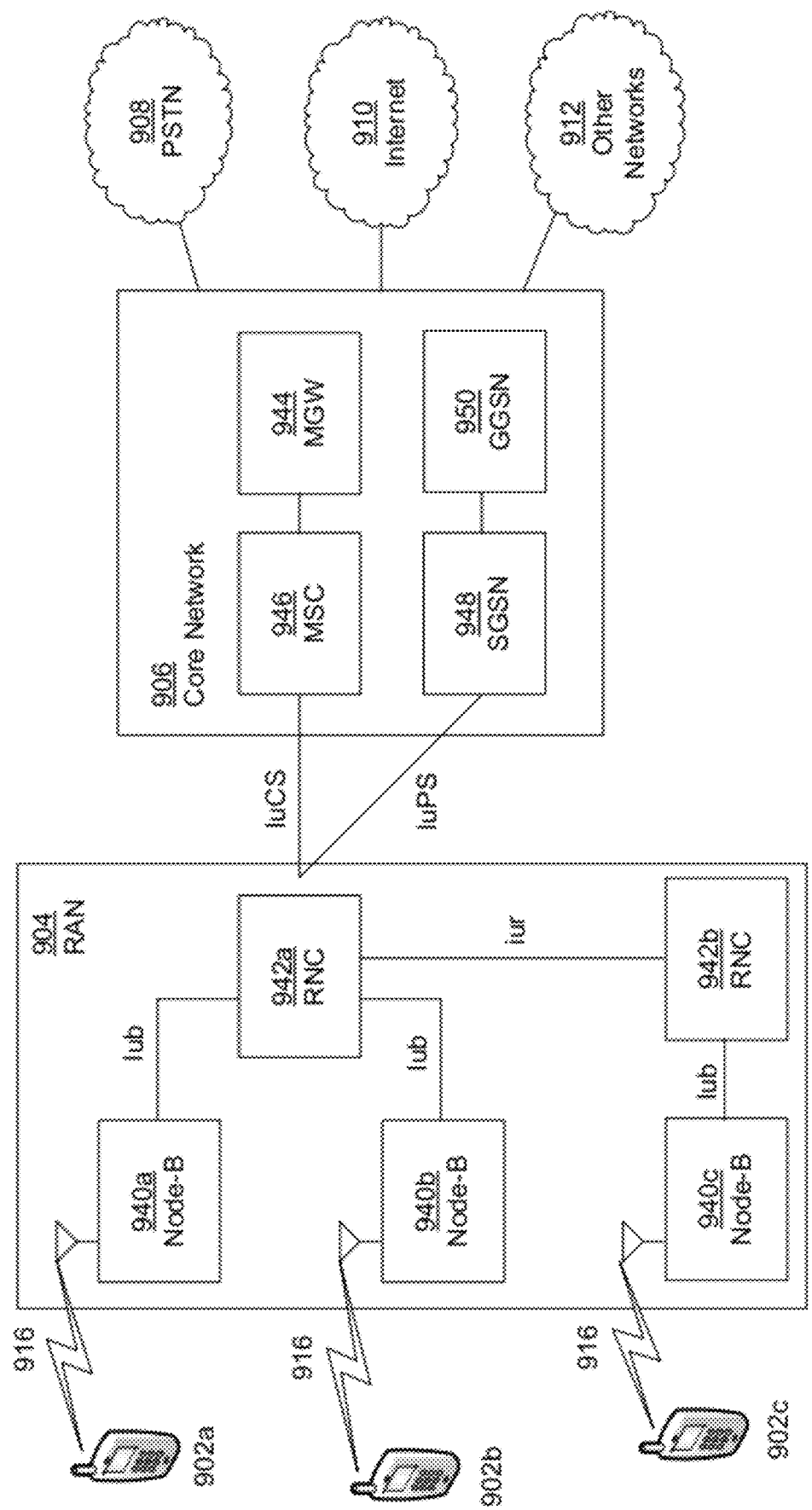
FIG. 11 is a system diagram of an example radio access network and an example core network that may be used within the communications system illustrated in FIG. 9.

FIG. 11 is a system diagram of the RAN 904 and the core network 906 according to an embodiment. As noted above, the RAN 904 may employ a UTRA radio technology to communicate with the WTRUs 902a, 902b, 902c over the air interface 916. The RAN 904 may also be in communication with the core network 906. As shown in FIG. 11, the RAN 904 may include Node-Bs 940a, 940b, 940c, which may each include one or more transceivers for communicating with the WTRUs 902a, 902b, 902c over the air interface 916. The Node-Bs 940a, 940b, 940c may each be associated with a particular cell (not shown) within the RAN 904. The RAN 904 may also include RNCs 942a, 942b. It will be appreciated that the RAN 904 may include any number of Node-Bs and RNCs while remaining consistent with an embodiment.

As shown in FIG. 11, the Node-Bs 940a, 940b may be in communication with the RNC 942a. Additionally, the Node-B 940c may be in communication with the RNC 942b. The Node-Bs 940a, 940b, 940c may communicate with the respective RNCs 942a, 942b via an Iub interface. The RNCs 942a, 942b may be in communication with one another via an Iur interface. Each of the RNCs 942a, 942b may be configured to control the respective Node-Bs 940a, 940b, 940c to which it is connected. In addition, each of the RNCs 942a, 942b may be configured to carry out or support other functionality, such as outer loop power control, load control, admission control, packet scheduling, handover control, macrodiversity, security functions, data encryption, and the like.

The core network 906 shown in FIG. 11 may include a media gateway (MGW) 944, a mobile switching center (MSC) 946, a serving GPRS support node (SGSN) 948, and/or a gateway GPRS support node (GGSN) 950. While each of the foregoing elements are depicted as part of the core network 906, it will be appreciated that any one of these elements may be owned and/or operated by an entity other than the core network operator.

The RNC 942a in the RAN 904 may be connected to the MSC 946 in the core network 106 via an IuCS interface. The MSC 946 may be connected to the MGW 944. The MSC 946 and the MGW 944 may provide the WTRUs 902a, 902b, 902c with access to circuit-switched networks, such as the PSTN 908, to facilitate communications between the WTRUs 902a, 902b, 902c and traditional land-line communications devices.

The RNC 942a in the RAN 904 may also be connected to the SGSN 948 in the core network 906 via an IuPS interface. The SGSN 948 may be connected to the GGSN 950. The SGSN 948 and the GGSN 950 may provide the WTRUs 902a, 902b, 902c with access to packet-switched networks, such as the Internet 910, to facilitate communications between and the WTRUs 902a, 902b, 902c and IP-enabled devices.

As noted above, the core network 906 may also be connected to the networks 912, which may include other wired or wireless networks that are owned and/or operated by other service providers.

Figure 12:
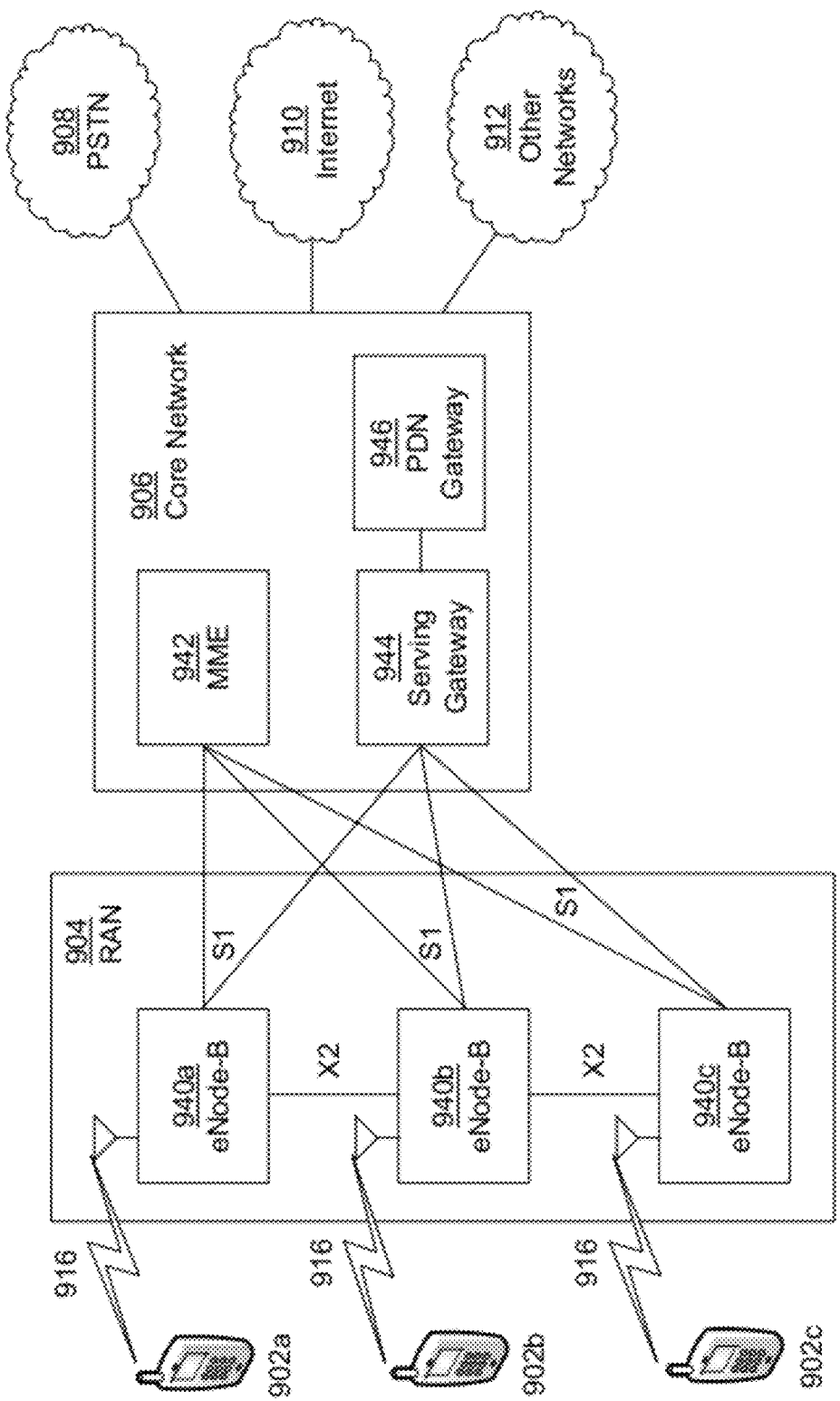
FIG. 12 is a system diagram of another example radio access network and an example core network that may be used within the communications system illustrated in FIG. 9.

FIG. 12 is a system diagram of the RAN 904 and the core network 906 according to an embodiment. As noted above, the RAN 904 may employ an E-UTRA radio technology to communicate with the WTRUs 902a, 902b, 902c over the air interface 916. The RAN 904 may also be in communication with the core network 106.

The RAN 904 may include eNode-Bs 940a, 940b, 940c, though it will be appreciated that the RAN 904 may include any number of eNode-Bs while remaining consistent with an embodiment. The eNode-Bs 940a, 940b, 940c may each include one or more transceivers for communicating with the WTRUs 902a, 902b, 902c over the air interface 916. In one embodiment, the eNode-Bs 940a, 940b, 940c may implement MIMO technology. Thus, the eNode-B 940a, for example, may use multiple antennas to transmit wireless signals to, and receive wireless signals from, the WTRU 902a.

Each of the eNode-Bs 940a, 940b, 940c may be associated with a particular cell (not shown) and may be configured to handle radio resource management decisions, handover decisions, scheduling of users in the uplink and/or downlink, and the like. As shown in FIG. 12, the eNode-Bs 940a, 940b, 940c may communicate with one another over an X2 interface.

The core network 906 shown in FIG. 12 may include a mobility management gateway (MME) 942, a serving gateway 944, and a packet data network (PDN) gateway 946. While each of the foregoing elements are depicted as part of the core network 906, it will be appreciated that any one of these elements may be owned and/or operated by an entity other than the core network operator.

The MME 942 may be connected to each of the eNode-Bs 942a, 942b, 942c in the RAN 904 via an S1 interface and may serve as a control node. For example, the MME 942 may be responsible for authenticating users of the WTRUs 902a, 902b, 902c, bearer activation/deactivation, selecting a particular serving gateway during an initial attach of the WTRUs 902a, 902b, 902c, and the like. The MME 942 may also provide a control plane function for switching between the RAN 904 and other RANs (not shown) that employ other radio technologies, such as GSM or WCDMA.

The serving gateway 944 may be connected to each of the eNode Bs 940a, 940b, 940c in the RAN 904 via the S1 interface. The serving gateway 944 may generally route and forward user data packets to/from the WTRUs 902a, 902b, 902c. The serving gateway 944 may also perform other functions, such as anchoring user planes during inter-eNode B handovers, triggering paging when downlink data is available for the WTRUs 902a, 902b, 902c, managing and storing contexts of the WTRUs 902a, 902b, 902c, and the like.

The serving gateway 944 may also be connected to the PDN gateway 946, which may provide the WTRUs 902a, 902b, 902c with access to packet-switched networks, such as the Internet 910, to facilitate communications between the WTRUs 902a, 902b, 902c and IP-enabled devices.

The core network 906 may facilitate communications with other networks. For example, the core network 906 may provide the WTRUs 902a, 902b, 902c with access to circuit-switched networks, such as the PSTN 908, to facilitate communications between the WTRUs 902a, 902b, 902c and traditional land-line communications devices. For example, the core network 906 may include, or may communicate with, an IP gateway (e.g., an IP multimedia subsystem (IMS) server) that serves as an interface between the core network 906 and the PSTN 908. In addition, the core network 906 may provide the WTRUs 902a, 902b, 902c with access to the networks 912, which may include other wired or wireless networks that are owned and/or operated by other service providers.

Figure 13:
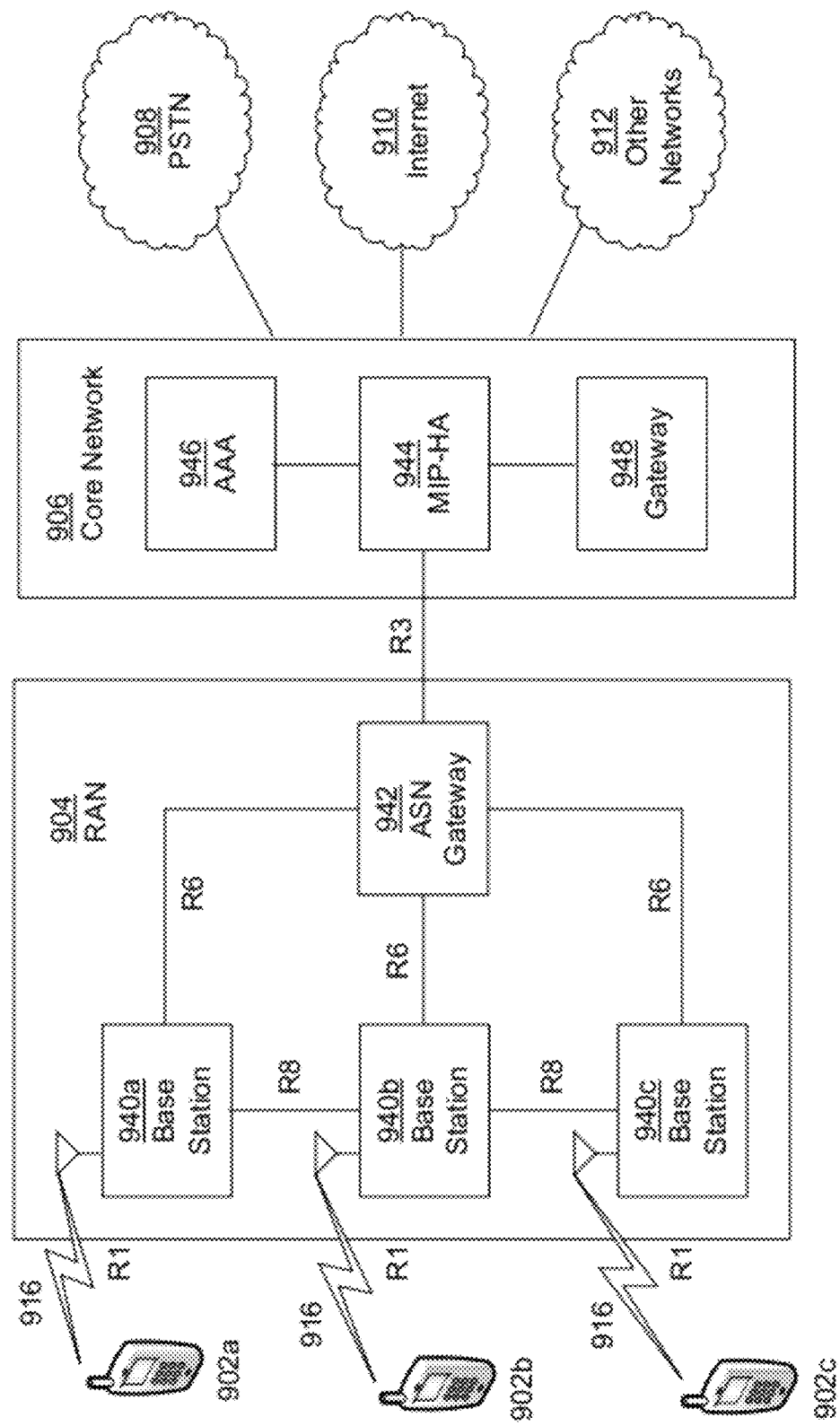
FIG. 13 is a system diagram of another example radio access network and an example core network that may be used within the communications system illustrated in FIG. 9.

FIG. 13 is a system diagram of the RAN 904 and the core network 106 according to an embodiment. The RAN 904 may be an access service network (ASN) that employs IEEE 802.16 radio technology to communicate with the WTRUs 902a, 902b, 902c over the air interface 916. As will be further discussed below, the communication links between the different functional entities of the WTRUs 902a, 902b, 902c, the RAN 904, and the core network 906 may be defined as reference points.

As shown in FIG. 13, the RAN 904 may include base stations 940a, 940b, 940c, and an ASN gateway 942, though it will be appreciated that the RAN 904 may include any number of base stations and ASN gateways while remaining consistent with an embodiment. The base stations 940a, 940b, 940c may each be associated with a particular cell (not shown) in the RAN 904 and may each include one or more transceivers for communicating with the WTRUs 902a, 902b, 902c over the air interface 916. In one embodiment, the base stations 940a, 940b, 940c may implement MIMO technology. Thus, the base station 940a, for example, may use multiple antennas to transmit wireless signals to, and receive wireless signals from, the WTRU 902a. The base stations 940a, 940b, 940c may also provide mobility management functions, such as handoff triggering, tunnel establishment, radio resource management, traffic classification, quality of service (QoS) policy enforcement, and the like. The ASN gateway 942 may serve as a traffic aggregation point and may be responsible for paging, caching of subscriber profiles, routing to the core network 906, and the like.

The air interface 916 between the WTRUs 902a, 902b, 902c and the RAN 904 may be defined as an R1 reference point that implements the IEEE 802.16 specification. In addition, each of the WTRUs 902a, 902b, 902c may establish a logical interface (not shown) with the core network 906. The logical interface between the WTRUs 902a, 902b, 902c and the core network 906 may be defined as an R2 reference point, which may be used for authentication, authorization, IP host configuration management, and/or mobility management.

The communication link between each of the base stations 940a, 940b, 940c may be defined as an R8 reference point that includes protocols for facilitating WTRU handovers and the transfer of data between base stations. The communication link between the base stations 940a, 940b, 940c and the ASN gateway 942 may be defined as an R6 reference point. The R6 reference point may include protocols for facilitating mobility management based on mobility events associated with each of the WTRUs 902a, 902b, 900c.

As shown in FIG. 13, the RAN 904 may be connected to the core network 906. The communication link between the RAN 904 and the core network 906 may defined as an R3 reference point that includes protocols for facilitating data transfer and mobility management capabilities, for example. The core network 906 may include a mobile IP home agent (MIP-HA) 944, an authentication, authorization, accounting (AAA) server 946, and a gateway 948. While each of the foregoing elements are depicted as part of the core network 906, it will be appreciated that any one of these elements may be owned and/or operated by an entity other than the core network operator.

The MIP-HA may be responsible for IP address management, and may enable the WTRUs 902a, 902b, 902c to roam between different ASNs and/or different core networks. The MIP-HA 944 may provide the WTRUs 902a, 902b, 902c with access to packet-switched networks, such as the Internet 910, to facilitate communications between the WTRUs 902a, 902b, 902c and IP-enabled devices. The AAA server 946 may be responsible for user authentication and for supporting user services. The gateway 948 may facilitate interworking with other networks. For example, the gateway 948 may provide the WTRUs 902a, 902b, 902c with access to circuit-switched networks, such as the PSTN 908, to facilitate communications between the WTRUs 902a, 902b, 902c and traditional land-line communications devices. In addition, the gateway 948 may provide the WTRUs 902a, 902b, 902c with access to the networks 912, which may include other wired or wireless networks that are owned and/or operated by other service providers.

Although not shown in FIG. 13, it will be appreciated that the RAN 904 may be connected to other ASNs and the core network 906 may be connected to other core networks. The communication link between the RAN 904 the other ASNs may be defined as an R4 reference point, which may include protocols for coordinating the mobility of the WTRUs 902a, 902b, 902c between the RAN 904 and the other ASNs. The communication link between the core network 906 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the WTRU having selected a first domain, the method comprising:

the WTRU performing a service request procedure for a circuit switched fallback (CSFB);

the WTRU determining that a bearer is not established and entering an EMI-DEREGISTERED state, wherein entering the EMM-DEREGISTERED state includes performing a detach procedure without initiation of an attach procedure, and wherein the determination is associated with the service request procedure;

the WTRU reselecting to a second domain while the WTRU is in the EMI-DEREGISTERED state, wherein the second domain is a circuit switched domain; and the WTRU continuing with a circuit switched service.

2. The method of claim 1, wherein the reselecting to the circuit switched domain comprises reselecting to at least one of a GERAN or a UTRAN.

3. The method of claim 1, further comprising sending a circuit switched service request when the CSFB is due to a mobile originated circuit switched call request.

4. The method of claim 1, further comprising sending a paging response when the CSFB is due to a mobile terminated circuit switched call request.

5. The method of claim 1, wherein the service request procedure comprises sending a service request for the circuit switched fallback (CSFB) from an idle mode.

6. A wireless transmit/receive unit (WTRU), the WTRU having selected a first domain, the WTRU comprising:

a processor configured to:

perform a service request procedure for a circuit switched fallback (CSFB);

determine that a bearer is not established and enter an EMM-DEREGISTERED state, wherein being configured to enter the EMM-DEREGISTERED state comprises being configured to perform a detach procedure without initiation of an attach procedure, and wherein the determination is associated with the service request procedure; and reselect to a second domain while in the EMM-DEREGISTERED state, the second domain being a circuit switched domain; and continue with a circuit switched service.

7. The WTRU of claim 6, wherein being configured to reselect to the circuit switched domain comprises being configured to reselect to at least one of a GERAN or a UTRAN.

8. The WTRU of claim 6, wherein the processor is further configured to send a circuit switched service request when the CSFB is due to a mobile originated circuit switched call request.

9. The WTRU of claim 6, wherein the processor is further configured to send a paging response when the CSFB is due to a mobile terminated circuit switched call request.

10. The WTRU of claim 6, wherein being configured to perform the service request procedure comprises being configured to send a service request for the circuit switched fallback (CSFB) from an idle mode.

11. The method of claim 1, wherein the bearer corresponds to a default EPS bearer context.

12. The WTRU of claim 6, wherein the bearer corresponds to a default EPS bearer context.

13. The method of claim 1, wherein the detach procedure comprises a local detach procedure.

14. The WTRU of claim 6, wherein the detach procedure comprises a local detach procedure.

* * * * *

UNITED STATES PATENT AND TRADEMARK OFFICE
CERTIFICATE OF CORRECTION

PATENT NO. : 10,945,302 B2  
APPLICATION NO. : 13/072692  
DATED : March 9, 2021  
INVENTOR(S) : Tooher et al.

Page 1 of 1

It is certified that error appears in the above-identified patent and that said Letters Patent is hereby corrected as shown below:

In the Claims

Column 21, Line 8: replace "EMI-DEREGISTERED" with -- EMM-DEREGISTERED --

Column 21, Line 14: replace "EMI-DEREGISTERED" with -- EMM-DEREGISTERED --

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*